United States Patent Office 3,044,549
Patented July 17, 1962

3,044,549
WELL TREATING PROCESSES
Julius E. Jones, 207 Leggett Bldg., Midland, Tex.
No Drawing. Filed Mar. 27, 1957, Ser. No. 648,772
7 Claims. (Cl. 166—42)

This invention relates to processes of treatment of oil bearing formations in the earth to increase their production, and more particularly to processes in which oil blanketed acid is forced into earth formations, especially of limestone and its components, under high pressure to fracture them as well as cause chemical reaction with them.

It has been recognized that the productivity of wells in earth formations of low permeability may sometimes be increased by treatments which enlarge the fluid passageways therein. Various treatments have been employed to this end.

One known method of treating a formation is to mechanically fracture the formation. A method of this type is disclosed in the patent to Farris, No. Re. 23,733. According to such methods, a low-penetrating fluid mixed with sand is pumped into the well at very high pressures to crack or fracture the formation, or to enlarge existing openings through it. The sand remains in the openings formed by the fracturing operation to act as a prop to prevent subsequent closing of these openings.

Another treatment that has been widely used in calcareous formations is the introduction into the well of hydrochloric acid. The hydrochloric acid reacts chemically with the calcites in the formation so that portions of these formations may be removed to increase the permeability of the earth in the vicinity of the well. Such acid treatments have not been effective in many instances in effecting substantial removal of the oil from the formation.

In some instances, attempts have been made to obtain the advantages of both mechanical fracturing and chemical dissolution of portions of the formation. One such method utilizes a gelled or thickened acid composition as the low-penetrating fluid in a conventional fracturing process.

Although the last-mentioned method has been used to advantage in some situations, the results have not always been satisfactory. In this connection, it is noted that the physical condition of the acid, as it is brought into contact with the formation, is not ideal as far as the desired chemical reaction is concerned. Moreover, the very high viscosity of the composition minimizes its rate of flow into the formation. Consequently, chemical reaction between the formation and the first acid to reach it results in the production of water which, in turn, dilutes subsequently arriving acid and contributes to the formation of blocking emulsions.

It is an object of this invention to provide a new method of treating a formation with oil-blanketed acid so as to increase its fluid productivity.

A more specific object of this invention is to provide such a method in which an acid may be delivered to parts of the formation remote from the bore of the well in such a condition that it may react effectively with the solids there and in which the advantages of mechanical fracturing may be obtained simultaneously.

In accordance with this invention, two distinct fluids are pumped simultaneously into a well under high pressure and at a high injection rate. One fluid would be a suitable enveloping fluid for the acid, either with or without a particulate solid, such as sand, that may be added thereto. The other fluid is an acid to which a non-emulsifying or emulsion-breaking agent may or may not have been added.

Although the exact nature of the actions of these fluids in the formation being treated is not fully understood, it is thought that the high injection rate of oil and acid causes the acid to be broken up into minute particles, each of which is enveloped with a film of oil, and the oil-blanketed acid is then forced through cracks in the formation to points remote from the bore hole, with no substantial chemical reaction taking place until the treating fluids have been placed at the desired position.

Since the acid is blanketed by the oil during its initial movements into the formation, its tendency to react immediately with the calcites in the vicinity of the well bore is reduced, and the formation of water, with consequent dilution of subsequently arriving acid and with consequent production of blocking emulsions, is minimized. Hence, it appears that the full effectiveness of the fracturing process is realized in spite of the presence of the acid, and that, at the same time, the acid is delivered in effective concentrations to zones farther from the bore hole than is possible with heretofore known methods.

It should be understood that the theory just explained is offered merely to facilitate an understanding of the invention. Whatever the correct theory may be, the treatment by the process of this invention has proved to be beneficial in actual practice.

The fracturing fluid used in carrying out this invention preferably is ordinary lease crude oil, inasmuch as this is more readily available, right out of a stock tank. However, if the gravity is too high, above about 42 or 43 gravity, some refined oil can be added to lower the gravity to a usable flowing fluid. The reference to "refined oil" means the resultant after removal of some gasoline, kerosene, etc., from the lease crude.

The acid combined with the oil, according to this invention, may be any of the emulsion breaking acids, or other suitable acids effective in removing oil from the earth formation.

The acid is introduced into the well in the form of a liquid. Usually, a water solution of hydrochloric acid having a concentration of about 15% will be found satisfactory, but other acids or concentrations may be used when desired. In general, the concentration of the acid solution is determined by the same factors as are involved in conventional acid treating procedures.

Since the effectiveness of the treatment of this invention depends to a great extent upon getting the acid to the formation being treated in the proper physical condition, attention is given to the problem of the formation of emulsions, and when required, suitable non-emulsifying or emulsion-breaking agents may be incorporated in the acid solution prior to its introduction into the well. A number of these agents are known to the art, and no useful purpose would be served by a detailed discussion of them here. One such agent which has been used successfully in the practice of this invention is marketed by the Aquaness Corporation of Houston, Texas, under the trade name "Aquaness A–C–165." Many other such agents may be used, and as examples, reference is made to the disclosures of the following patents: Barnickel, No. 1,467,831; Walker, No. 1,944,021; De Groote, No. 2,104,793; and Salathiel, No. 2,543,871.

The amount and kind of non-emulsifying or emulsion-breaking agent, if any, to be employed may be ascertained by a simple test procedure. Such a test may be based upon the preparation of an oil-acid mixture corresponding approximately to the proportions of these liquids which will be used in the treatment of a well. This is mixed several times through suitable homogenizing apparatus, and its break-out characteristics are ascertained. A 95% break-out at formation temperature is desirable, but lower figures, down to 80% break-out, are usable.

If the initial test mixture does not have the desired break-out characteristics, other test mixtures, including different kinds and amounts of non-emulsifying or emulsion-breaking agents, are prepared and tested. Of these, a mixture having suitable break-out characteristics will be selected, and the treatment of the well may proceed using the same proportions of oil, acid, and non-emulsifying agent as this sample.

The ratio of the acid solution to the fracturing liquid employed in this invention is subject to substantial variations depending upon the conditions which exist at the formations to be treated. However, there are general factors which tend to place an upper limit upon the amount of acid used. In all cases, the total fluid, that is, the mixture of fracturing liquid and acid solution which exists at the formation, must be sufficiently viscous to serve as a fracturing fluid. Additionally, the amount of oil should exceed the amount of acid sufficiently to permit the oil to blanket particles of acid during the injection. Present experience indicates that probably the maximum amount of acid that may be used without exceeding these limitations is one part of acid to two parts of oil.

Sand has been used with a low-penetrating fluid in conventional fracturing processes. The use of particulate material for this purpose may be added to this process, if desired, as indicated above.

In practising the invention, it is preferred that the oil and the acid solution be pumped separately into the well as distinct fluids. This may be done by admitting these under the desired high pressure, i.e., in excess of 500# p.s.i. to the manifold at the top of the well. This procedure makes it possible to deliver to the formation the desired mixture without forming emulsions. If sand, or other particulate material, is to be added, this can be added to the oil before it is supplied to the manifold.

This technique can be carried a step further in wells which already have tubing in the casing, in that one of the fluids may be pumped into the annular space between the casing and the tubing, while the other fluid is being pumped into the tubing. It is not necessary to remove the tubing. Neither is it necessary to introduce tubing if it is not in the well.

If there is no tubing in the well, the oil and acid will be combined under high pressure in the manifold on the top of the casing, and will be carried downward as an oil-blanketed acid through the casing under the high pressure mentioned. If there is tubing in the well, and the oil and acid are forced downward separately in the tubing and casing, respectively, these will be mixed under high pressure to form the oil-blanked acid, at the bottom of the tubing.

The delivery of the fluids from the well to the formation to be treated may be accomplished by means corresponding to those commonly used in conventional fracturing or acidizing processes. The well casing may be perforated at the level of the formation, etc., as well known in the art.

Of course, the pumps for introducing the fluids into the well must develop pressures sufficiently high to bring about the desired treatment of the formation with oil-blanketed acid. Also, the rate of injection of the fluids must be high in order to maintain the proper motion and to sustain movement of the oil-blanketed acid into the formation so as to prevent excessive initial reactions between the acid and those portions of the formation close to the well.

Although the injection rate may be varied widely in accordance with such factors as the depth of the well, the number of casing perforations through which the treatment is being made, the thickness of the formation being treated, etc., one example of a desirable rate of injection is from 20 to 35 barrels of total fluid per minute. It should be understood, however, that the injection rate may be more or less than 20 barrels per minute, which may be used successfully in carrying out the method of this invention.

The oil-blanketed acid pumped under high pressure into the formation leaves no chance for the acid to break out of the mixture until it reaches the point of production. The well is then closed in and left for a reasonable length of time, preferably a few hours. Then the residual and resultant materials are removed from the well and formation by flowing, swabbing or pumping, or during the course of ordinary production.

The combined fracturing and acid treatment heretofore described may be preceded by a conventional acid treatment, if desired. In actual practice, the combined treatment has been carried out on several wells where ordinary acid treatments had been tried but had failed to produce the desired results. In other instances, where the operator had become convinced that the combined fracturing and acid treatment would be necessary, amounts of acid, in the neighborhood of 2,000 and 3,000 gallons of 15% hydrochloric acid, have been introduced into the well immediately prior to the combined fracturing and acid treatment, so that the two treatment steps took place as one continuous operation.

To further illustrate the invention, a specific example of a treatment which has been carried out in the field now will be described. The treatment was performed in a well in West Texas in the "Clear Fork" production zone.

The Clear Fork zone lies at a depth of 6000 to 7400 feet. It is 900 to 1000 feet above the "Spraberry" production zone. Five productive stringers may exist in it with several more of questionable significance. The finely fractured stringers are separated by relatively thick shale sections. Porosity is low, averaging less than 5%. Permeability is extremely low. Composition consists of quartz and calcite, with streaks of silty clay and shale. Solubility as calcium carbonate varies from 20 to 90 percent. Oil produced is a sweet oil of 35 to 40 gravity. It is a gas solution drive with an erratic gas-oil ratio.

To date there are about 300 wells producing from the "Clear Fork" zone. Most wells are completed through perforations. The majority of the wells have been treated by acidizing, but without obtaining satisfactory production. A few sand-oil fracturing jobs have been attempted but no satisfactory results have been reported. Acid-fracturing jobs have been performed but only one satisfactory job was reported. On many acid jobs and all fracturing jobs considerable difficulty was encountered due to emulsions.

The particular well treated in accordance with this invention had been treated previously with 10,000 gallons of hydrochloric acid and was producing 85 barrels of oil per day. The casing in the well had a diameter of 5½ inches and had been perforated at the zone where the treatment was to be applied. The well also was provided with tubing having a diameter of 2 inches.

To effect the treatment on that particular well, in accordance with the present invention, 20,000 gallons of oil mixed with 30,000 pounds of sand was pumped down the annular space between the tubing and the casing at a pressure of between 2,500 and 3,300 pounds per square inch. The oil used was itself a mixture of approximately equal parts of refined oil and lease crude taken from the "Clear Fork" zone. Simultaneously with the introduction of the oil-sand mixture, there was pumped down the tubing, at the same pressure as the oil, 2,000 gallons of 15% hydrochloric acid, to which had been added 200 gallons of a non-emulsifying agent sold by the Aquaness Corporation of Houston, Texas, under the trade name "Aquaness A–C–165." The average total injection rate into the formation being treated was 21 barrels per minute.

The test employed in determining the amount of "Aquaness A–C–165" to be used in this treatment utilized a basic test sample of 45% refined oil, 45% lease crude, and 10% hydrochloric acid, to which sufficient "Aquaness A–C–165" had been added to give a 95% break-out at formation temperature to the mixture after it had been mixed twice through a hand homogenizer.

After treatment of the above well, it was closed in for a few hours, after which it was pumped as usual; the production rose to 165 barrels of oil per day.

Other wells have been treated in a manner similar to that described above, and in some, even more spectacular results have been obtained. One well was not producing any oil, and after treatment, swabbed over 260 barrels. Another was producing 72 barrels per day, and after treatment went to 360 barrels per day.

While the invention has been described herein in some detail, variations and modifications will be apparent to persons skilled in the art. It is intended, therefore, that the foregoing description be considered as exemplary only, and that the scope of the invention be ascertained from the following claims.

I claim:

1. In a method of producing oil from a well in earth formations, the steps of pumping simultaneously into the well oil and an acid, joining the oil and acid in the well under high pressure so that the oil and acid are mixed but not emulsified, and continuing to maintain a high pressure which is sufficient to fracture the formation and which will carry rapidly the non-emulsified mixture of oil and acid to points remote from the borehole.

2. In a method of producing oil from a well in earth formations, the steps of pumping simultaneously into the well oil and an acid to which has been added a non-emulsifying agent, mixing the oil and acid in the well under high pressure so that the oil and acid retain their respective identities and characteristics in the resulting mixture, and continuing to maintain a high pressure which is sufficient to fracture the formation and which will carry rapidly the non-emulsified mixture of oil and acid to points remote from the borehole.

3. In a method of producing oil from a well in earth formations, the steps of injecting simultaneously into the well crude oil and an acid, joining the oil and acid in the well under high pressure so that the oil and acid are mixed but not emulsified, maintaining a high pressure and sufficiently high injection rate of oil and acid so as to fracture the formation and cause the non-emulsified oil and acid to flow rapidly to points remote from the borehole.

4. In a method of increasing the production of oil from a well in an earth formation, the steps of injecting under pressure oil and an acid in the well so that the oil and acid mix with one another but do not form an emulsion, and rapidly forcing the non-emulsified oil and acid simultaneously into the formation remote from the borehole by maintaining a high pressure and rate of injection which are sufficient to fracture the formation.

5. In a method of increasing the production of oil from a well in an earth formation, the steps of injecting under pressure into the well as separate fluids oil and an acid containing a non-emulsifying agent, allowing the oil and acid to join in the well to become mixed but not emulsified, and rapidly forcing the non-emulsified oil and acid simultaneously into the formation remote from the borehole by maintaining a high pressure and rate of injection which are sufficient to fracture the formation.

6. In a method of producing oil from a well in earth formations, the steps of flowing together oil and an emulsion breaking acid so as to mix the oil and acid because of the turbulence of the flowing liquids, and then forcing the non-emulsified mixture rapidly into the earth formations to points remote from the borehole of the well by maintaining on the oil and acid mixture a pressure which is sufficiently high to fracture the formation, whereby the oil and acid are kept mixed by the turbulence created when they flow rapidly through the cracks in the formations caused by the fracturing.

7. In a method of increasing the production of oil from a well in an earth formation, the steps of pumping a fracturing fluid into the well under a sufficiently high pressure and rate of injection to fracture the formation; at the same time, introducing into the well an acid which forms a mixture with the fracturing fluid but which does not form an emulsion or a solution with the acid; and rapidly forcing the non-emulsified mixture through the fractures into the formation remote from the bore hole by maintaining said high pressure and rate of injection.

References Cited in the file of this patent

UNITED STATES PATENTS

| | | |
|---|---|---|
| 1,237,139 | Yeoman | Aug. 14, 1917 |
| 1,944,021 | Walker | Jan. 16, 1934 |
| 1,969,230 | McMillen | Aug. 7, 1934 |
| 2,104,793 | De Groote | Jan. 11, 1938 |
| 2,689,009 | Brainerd | Sept. 14, 1954 |
| 2,802,531 | Cardwell | Aug. 13, 1957 |
| 2,910,436 | Fatt et al. | Oct. 27, 1959 |